(12) United States Patent
Neef et al.

(10) Patent No.: US 10,150,072 B2
(45) Date of Patent: Dec. 11, 2018

(54) SUPPORT TUBE, FILTER ELEMENT AND FILTER SYSTEM HAVING A SUPPORT TUBE AND METHOD AND DEVICE FOR PRODUCING THE SUPPORT TUBE

(71) Applicant: Mann+Hummel GMBH, Ludwigsburg (DE)

(72) Inventors: Pascal Neef, Leonberg (DE); Ivanka Poljak, Kornwestheim (DE); Michael Heim, Korntal-Müchingen (DE); Andreas Beck, Kirchheim a. N. (DE); Manuel Slugecic, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 377 days.

(21) Appl. No.: 14/997,724

(22) Filed: Jan. 18, 2016

(65) Prior Publication Data

US 2016/0193557 A1    Jul. 7, 2016

Related U.S. Application Data

(63) Continuation of application No. PCT/EP2014/060506, filed on May 22, 2014.

(30) Foreign Application Priority Data

Jul. 18, 2013  (DE) ........................ 10 2013 012 013

(51) Int. Cl.
*B01D 46/00* (2006.01)
*B29C 45/33* (2006.01)
(Continued)

(52) U.S. Cl.
CPC ..... *B01D 46/0005* (2013.01); *B01D 46/0001* (2013.01); *B01D 46/2411* (2013.01);
(Continued)

(58) Field of Classification Search
CPC ............ B01D 46/0001; B01D 46/0005; B01D 2265/06; B01D 46/2411; B29C 45/261;
(Continued)

(56) References Cited

U.S. PATENT DOCUMENTS 4,052,316 A * 10/1977 Berger, Jr. ........... B01D 17/045
  210/315
5,935,620 A  8/1999 Baudin
(Continued)

FOREIGN PATENT DOCUMENTS

FR  2401007 A1  3/1979

*Primary Examiner* — Robert Clemente
(74) *Attorney, Agent, or Firm* — James Hasselbeck

(57) ABSTRACT

A support tube for a filter element, in which the support tube is an elongated tubular member having a central longitudinal axis extending through a hollow interior of the support tube. The support tube has a plurality of through openings extending through a circumferential wall of the support tube and is formed in one piece and a unitary component. The plurality of through openings are bounded by at least five longitudinal webs which are polygonal in cross section in at least some sections in the longitudinal direction of the support tube. The at least five longitudinal webs are in each case formed symmetrically.

11 Claims, 3 Drawing Sheets

(51) Int. Cl.
    *B29C 45/26*     (2006.01)
    *F02M 35/02*     (2006.01)
    *F02M 35/024*     (2006.01)
    *B29C 45/37*     (2006.01)
    *B01D 46/24*     (2006.01)
    *B29L 23/00*     (2006.01)

(52) U.S. Cl.
CPC ............ *B29C 45/261* (2013.01); *B29C 45/33* (2013.01); *B29C 45/37* (2013.01); *F02M 35/0202* (2013.01); *F02M 35/02483* (2013.01); *B01D 2265/06* (2013.01); *B29L 2023/003* (2013.01); *B29L 2023/22* (2013.01); *F02M 35/0207* (2013.01)

(58) Field of Classification Search
CPC .... B29C 45/33; B29C 45/37; F02M 35/0202; F02M 35/02483; B29L 2023/003; B29L 2023/22
See application file for complete search history.

(56) References Cited

U.S. PATENT DOCUMENTS

| | | |
|---|---|---|
| 6,962,256 B2 | 11/2005 | Nguyen et al. |
| 7,413,588 B2 | 8/2008 | Holzmann et al. |
| 7,972,403 B2 | 7/2011 | Mouatt |
| 8,864,484 B2 | 10/2014 | Beck |
| 9,062,638 B2 | 6/2015 | Gorg et al. |
| 2011/0219768 A1* | 9/2011 | Namimatsu ........ B01D 46/0024 60/602 |
| 2014/0102058 A1 | 4/2014 | Kaufmann et al. |

* cited by examiner

SUPPORT TUBE, FILTER ELEMENT AND FILTER SYSTEM HAVING A SUPPORT TUBE AND METHOD AND DEVICE FOR PRODUCING THE SUPPORT TUBE

TECHNICAL FIELD

The invention relates to a support tube made of plastic for a filter element having a plurality of through openings, wherein the support tube is formed in one piece and the through openings are bounded by more than four longitudinal webs which are polygonal in cross section in at least some sections in the longitudinal direction of the support tube. Furthermore, the invention relates to a filter element and a filter system having such a support tube and to a method and a device for the production thereof.

BACKGROUND OF THE INVENTION

It has been known for a long time to provide support tubes made of plastic in filter elements, in particular in filter elements for motor vehicles. Support tubes of this kind are also referred to as center tubes and are known, for example, from DE 10 2011 018 366 A1. The support tubes are used to retain or support a filter medium, and the fluid to be filtered or the filtered fluid, in particular air, at least partially flows through them. For this purpose, the support tubes have openings which are separated from one another by longitudinal webs.

With larger designs of support tubes, such as those used in filter elements for trucks for example, it has proved for stability reasons to be advantageous to design the support tube with more than four longitudinal webs. A support tube with a multiplicity of longitudinal webs and openings has become known from EP 1 481 715 A1. The known support tube consists of a plurality of support tube elements which are designed in a basket shape and stacked inside one another. However, to provide such a multiplicity of support tube elements is relatively laborious and therefore expensive to produce and assemble. At the same time, with regard to the production costs, it must be borne in mind that the support tubes in question are mass-produced items, with which even minor improvements in the production of a single support tube have a significant effect on the overall production costs.

It has therefore been shown to be advantageous to design the support tubes in one piece. Such a one-piece support tube is disclosed in DE 10 2005 040 623 A1. The longitudinal webs of this known support tube are round in cross section. However, the support tube can be manufactured even more easily and therefore more cost effectively when the longitudinal webs have a polygonal cross section.

Support tubes of this kind are already manufactured by the applicant. FIG. 2—which will be explained later—shows such a known support tube in cross section. The support tube is produced in a plastic injection molding process and, because of the mold tool used to produce the support tube and for easier removal of the support tube from the mold, it has longitudinal webs with different shape and different cross section. Filter elements with such support tubes are used in filter systems, for example in air filter systems for trucks or construction vehicles, and can usually be fitted in the housing of the filter system with a freely selectable or random rotational orientation about their longitudinal axis. The filter systems frequently have a fluid sensor for determining the filtered fluid flow. Depending on the particular rotational orientation of the filter element and therefore the rotational orientation of the support tube in the housing of the filter system, with the filter elements having the known support tubes, deflections or reversals of the fluid flow in the filter element which are of different strengths can occur depending on the incoming flow to the longitudinal webs. As a result, the fluid flow at the measuring point of the fluid sensor is affected in an unpredictable way.

SUMMARY OF THE INVENTION

The invention is therefore based on the object of providing a support tube that enables both a reproducible fluid flow and can be produced easily and cost effectively.

According to the invention, this object is achieved by a support tube made of plastic for a filter system, wherein the support tube has a plurality of through openings and is formed in one piece and the through openings are bounded by more than four longitudinal webs which are polygonal in cross section in at least some sections in the longitudinal direction of the support tube, wherein the longitudinal webs are in each case designed symmetrically with respect to their central plane which runs in the longitudinal direction of the support tube and intersects the central longitudinal axis of the support tube.

In cross section, or at least with regard to their mutually opposing side flanks, the longitudinal webs are therefore formed symmetrically towards the center of the support tube. The fluid flow can therefore flow around the longitudinal webs uniformly. The polygonal design of the longitudinal webs enables cost-effective production. At the same time, the stability of the support tube is preserved by the number of longitudinal webs. In particular, all longitudinal webs are designed symmetrically with regard to their central plane.

The support tube can have any shape in cross section. For example, the support tube can have a substantially oval or polygonal cross section. However, a particularly uniform flow through the support tube and therefore a particularly precise measurement of the fluid flow can be achieved in that the support tube has a round cross section, that is to say designed radially symmetrically with respect to its central longitudinal axis.

Preferably, the longitudinal webs are designed rotationally symmetrically with respect to the central longitudinal axis of the support tube in order to enable a uniform incoming flow to the support tube from all outer sides.

In a particularly preferred embodiment of the invention, all longitudinal webs have the same cross section. As a result, the flow resistance of all longitudinal webs is identical, thus enabling different deflections of the fluid flow depending on the rotational orientation of the support tube to be reduced or prevented.

A structurally particularly simple production of the support tube can be achieved in that at least one longitudinal web, in particular all longitudinal webs, have a quadrangular cross section. At the same time, at least one longitudinal web, in particular all longitudinal webs, can have a rectangular or trapezoidal cross section. A trapezoidal cross section is particularly preferred when imaginary extensions of the side flanks of the longitudinal web intersect the central plane—which intersects the central longitudinal axis of the support tube—outside the support tube. In other words, at least one longitudinal web, preferably all longitudinal webs, can be designed with side flanks which become narrower towards the outside. As a result, the support tube is significantly easier to remove from the mold in the injection molding process.

Furthermore, the object according to the invention is achieved by a filter element having a previously described support tube and having a preferably ring-shaped filter medium which rests against the longitudinal webs of the support tube on the outside and is supported in the radial direction. In doing so—in order to provide a larger surface area—the filter medium can rest on the outside of the support tube having been folded several times. It is understood that the filter element can be provided with end plates at both ends in the known manner.

Furthermore, the object according to the invention is achieved by a filter system having a housing in which a previously described filter element is arranged, wherein the housing has a fluid inlet which is fluidically connected to the outside of the filter medium and the housing has a fluid outlet which is fluidically connected to the inside of the support tube, wherein a fluid sensor, in particular a fluid mass sensor, is arranged between the support tube and the fluid outlet for measuring the fluid flow out of the housing. Here, the contaminated fluid flow is channeled from the fluid inlet of the housing on the outside of the filter medium and further radially into the inside of the support tube from where the now cleaned fluid is channeled axially out of the support tube to a fluid outlet of the housing. A fluid sensor, which measures at least part of the fluid quantity which flows out of the fluid outlet per unit time, can be arranged before the fluid outlet. The fluid quantity flowing out of the fluid outlet per unit time can then be determined or extrapolated based on this measurement. With the filter system according to the invention, the particular rotational orientation of the filter element or of the support tube fitted in the filter element relative to the fluid inlet has a less adulterating effect on the fluid flow measurement than is the case with conventional filter systems.

In particular the filter element and filter system according to the invention are a filter element and filter system respectively used for the filtration of inlet air for an internal combustion engine of a motor vehicle.

Furthermore, the object according to the invention is achieved by a device for the production by injection molding of a previously described support tube, wherein the device has a particularly cylindrically shaped mandrel, the outside of which bounds the inside of the support tube during the production thereof, wherein the device has at least three outer elements (also referred to as mold parts) which can be arranged around the mandrel, and a plastic, in particular thermoplastic, can be introduced between the mandrel and the outer elements into empty spaces of the device which are provided to form the longitudinal webs of the support tube, wherein the empty spaces are formed symmetrically to the central plane thereof which runs in the longitudinal direction of the mandrel and intersects the central longitudinal axis of the mandrel.

The device according to the invention for producing the support tube therefore comprises at least four elements: a mandrel, which can also be formed in several parts and bounds the inside of the support tube, as well as at least three outer elements which bound the outside of the support tube. Mandrel and outer elements touch one another in the region in which the openings of the support tube are formed. Empty spaces or cavities, into which plastic can be injected, are provided between the mandrel and the outer elements in order to form the longitudinal webs of the support tube, wherein the longitudinal webs have the shape of the empty spaces. In order to reduce or prevent a later rotational-orientation-dependent deflection of the fluid flow around the longitudinal webs, the empty spaces are designed in such a way that the longitudinal webs are in each case formed symmetrically with respect to the central plane thereof which runs in the longitudinal direction of the support tube and intersects the central longitudinal axis of the support tube.

After the plastic has set in the device, the outer elements can be removed from the support tube particularly easily when an empty space for a longitudinal web is provided in at least one region between two outer elements and the mandrel, in particular in all regions between two outer elements and the mandrel. This enables the outer elements to be lifted from both sides of the longitudinal webs.

The device for forming a support tube is preferably designed with more than four empty spaces, wherein, according to the invention, for s longitudinal webs $a=s/2$ outer elements are provided on the device and a is a rounded-up whole number. If, for example, a support tube with $s=8$ longitudinal webs is produced, then $a=s/2=8/2=4$ outer elements are provided for this. If, on the other hand, a support tube with $s=13$ longitudinal webs is produced, then $a=s/2=13/2=6.5=7$ outer elements are provided for this. In this way, the number of outer elements for producing the support tube is kept small. The device can therefore be designed structurally in a particularly simple manner. The large number of empty spaces and the resulting large number of longitudinal webs enables a mechanically stable support tube to be produced.

The empty spaces are preferably polygonal in shape in order to enable cost-effective production. Particularly preferably, the empty spaces are trapezoidal in cross section, wherein the side flanks of the empty space taper towards one another away from the mandrel, that is to say the cross section of the empty spaces is designed to become narrower towards the outside. Empty spaces of this kind are therefore easy to produce as well as easy to separate from the resulting support tube.

The mandrel can have any shape in cross section. For example, the mandrel can have a substantially oval or polygonal cross section. However, a particularly uniform flow through the support tube and therefore a particularly precise measurement of the fluid flow as well as a structurally simple production of the support tube can be achieved in that the mandrel has a round cross section, that is to say designed radially symmetrically with respect to its central longitudinal axis.

Preferably, the empty spaces are designed rotationally symmetrically with respect to the central longitudinal axis of the mandrel in order to enable a uniform incoming flow to the longitudinal webs of the support tube from all its outer sides as well as easy removal of the support tube from the device.

In a particularly preferred embodiment of the invention, all empty spaces have the same cross section. As a result, the flow resistance of all the longitudinal webs formed in the empty spaces is identical, thus enabling rotational-orientation-dependent deflections of the fluid to be effectively prevented.

A structurally particularly simple production of the support tube can be achieved in that at least one empty space, in particular all empty spaces, have a quadrangular cross section.

Finally, the object according to the invention is achieved by a method for the production by injection molding of a one-piece support tube made of plastic for a filter system with the steps listed below:

a) Provision of a mandrel;

b) Pressing of at least three outer elements against the outside of the mandrel, wherein empty spaces running at least in sections in the longitudinal direction of the mandrel are produced between the outer elements and the mandrel and in each case are formed symmetrically with respect to the central plane thereof which runs in the longitudinal direction of the mandrel and intersects the central longitudinal axis of the mandrel;

c) Introduction of plastic into the empty spaces;

d) Setting of the plastic;

e) Spacing of the outer elements from the mandrel along the central planes of the empty spaces which intersect the central longitudinal axis of the mandrel.

The described method is preferably employed using the previously described device for the production of the previously described support tube. In doing so, after the plastic has set, the outer elements are moved radially away from the center of the mandrel in order to prevent damage to the newly formed support tube.

Preferably, a device for forming a support tube having more than four empty spaces is used, wherein for s longitudinal webs a=s/2 outer elements are provided on the device and a is a rounded-up whole number.

At the same time, method step e) can be carried out particularly reproducibly and free from errors when an empty space for a longitudinal web is provided in at least one region between two outer elements and the mandrel, in particular in all regions between two outer elements and the mandrel.

Furthermore, the method can be carried out very cost effectively when the empty spaces are designed to be polygonal in cross section, in particular trapezoidal in cross section becoming narrower towards the outside.

A mandrel with a cross section of any shape can be employed. For example, a mandrel with a substantially oval or polygonal cross section can be used. However, a particularly uniform flow through the produced support tube can be achieved in that a mandrel which has a round cross section, that is to say designed radially symmetrically with respect to its central longitudinal axis, is used.

Preferably, empty spaces which are designed rotationally symmetrically with respect to the central longitudinal axis of the mandrel are used in order to enable a uniform incoming flow to the longitudinal webs of the support tube from all its outer sides as well as easy removal of the support tube from the device.

In a particularly preferred embodiment of the invention, all empty spaces used have the same cross section. As a result, the flow resistance of all the longitudinal webs formed in the empty spaces is identical, thus enabling rotational-orientation-dependent deflections of the fluid to be effectively prevented.

To produce the filter element according to the invention, a support tube produced in the manner described above and a suitable filter medium for the particular application are connected to one another, for example by means of two end plates.

BRIEF DESCRIPTION OF THE DRAWINGS

Further characteristics and advantages of the invention can be seen from the following detailed description of a plurality of exemplary embodiments of the invention based on the figures, the drawing, which shows the details essential to the invention, and from the patent claims.

The characteristics shown in the drawing are presented in such a way that the special features according to the invention can be made clearly visible. The different characteristics can be realized individually in their own right or jointly in any combination in variants of the invention.

Figure 1:
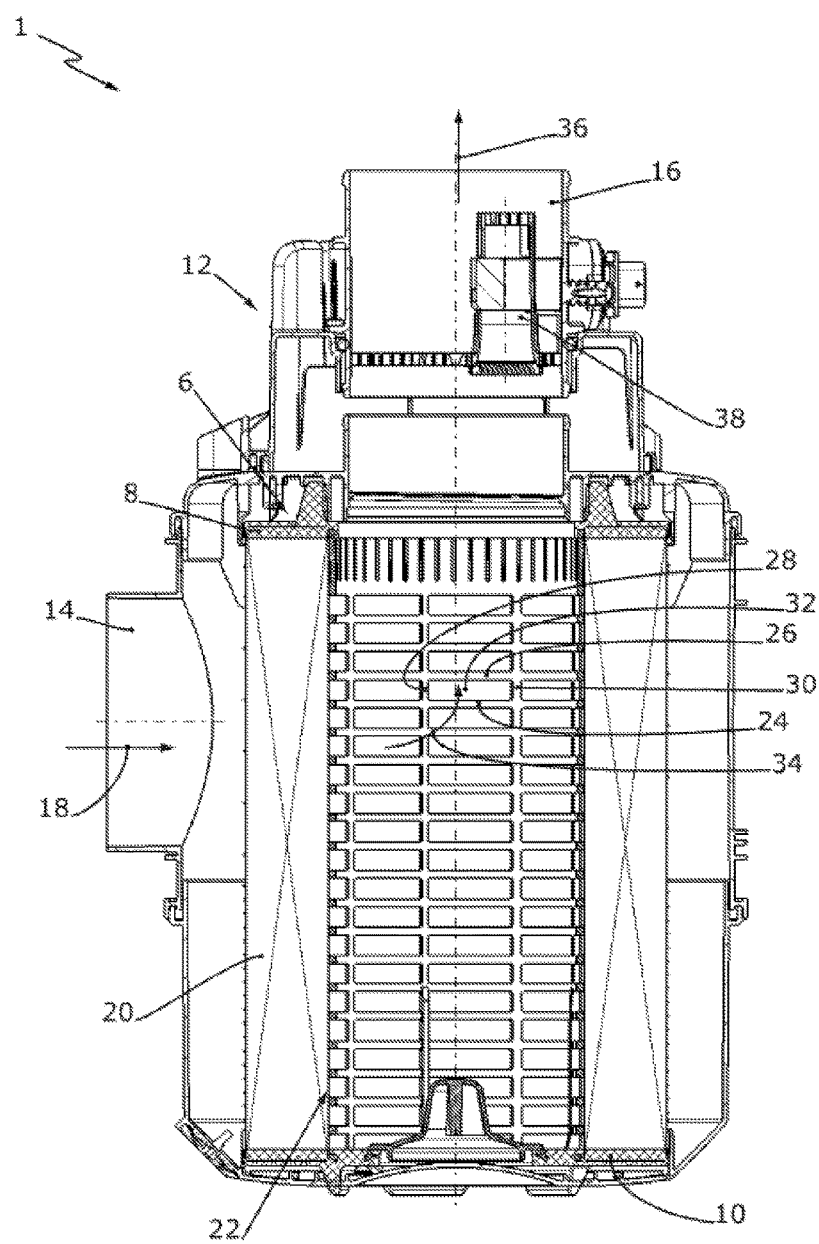

The prior art and exemplary embodiments of the invention are shown in the schematic drawing and are explained in more detail in the following description.

Figure 2:
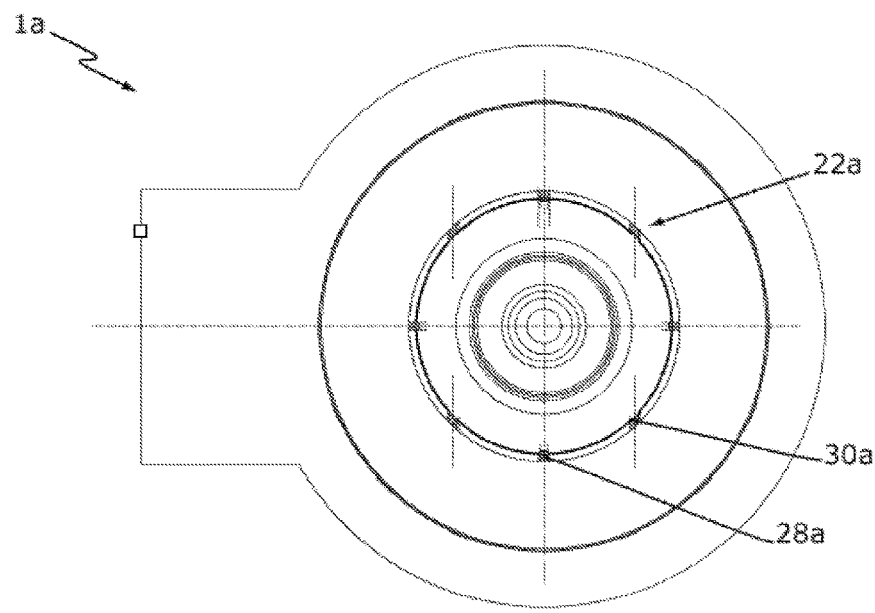
Figure 3:
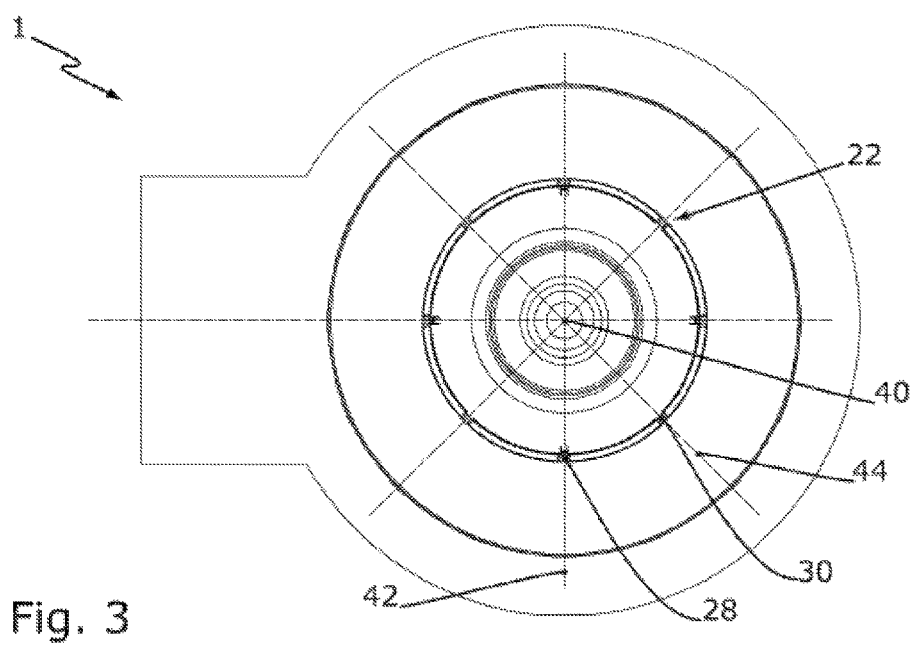
Figure 4:
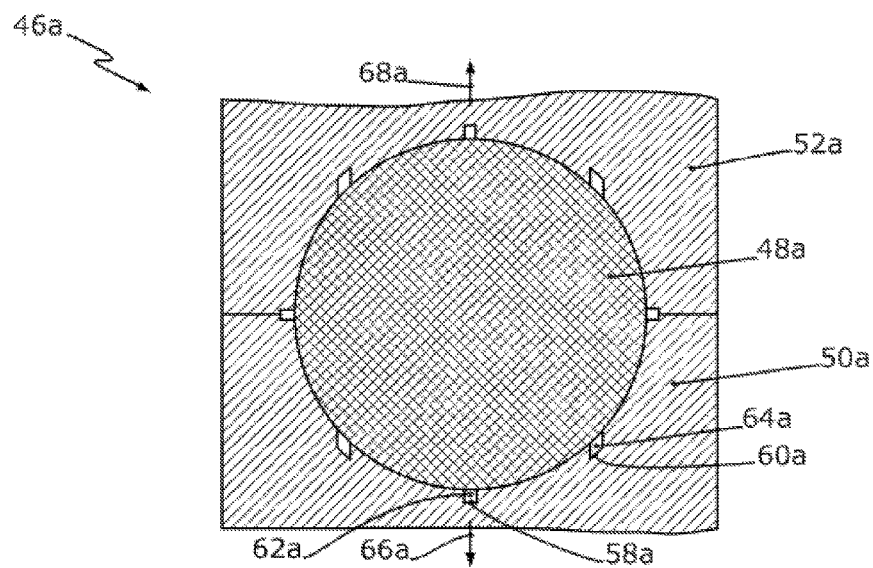
Figure 5:
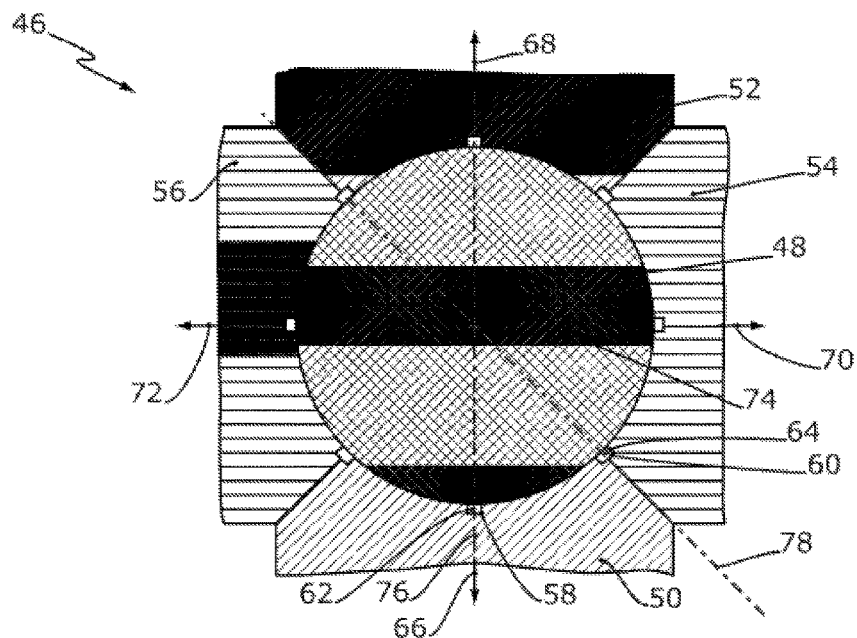

In the drawings:

FIG. 1 shows a sectional side view of a filter system according to the invention having a support tube according to the invention;

FIG. 2 shows a sectional plan view on a filter system according to FIG. 1 having a support tube according to the prior art;

FIG. 3 shows a sectional plan view on the filter system according to FIG. 1 having a support tube according to the invention;

FIG. 4 shows a sectional plan view on a device for the production of the support tube from FIG. 2 according to the prior art; and FIG. 5 shows a sectional plan view on a device according to the invention for the production of the support tube according to the invention according to FIG. 1 and FIG. 3.

DETAILED DESCRIPTION OF THE INVENTION

FIG. 1 shows a filter system 1 according to the invention, here an air filter system, having a filter element 6. The filter element 6 has a first end plate 8 and a second end plate 10 and is arranged in a housing 12 which has a fluid inlet 14 and a fluid outlet 16. The fluid to be cleaned (not shown), here air to be cleaned, flows in the direction of a first arrow 18 onto a filter medium 20 of the filter element 6, which is folded several times and surrounds a central or support tube 22 of the filter element 6. In doing so, the filter medium 20 rests directly on the outside of the support tube 22.

The support tube 22 is formed in one piece from plastic and has a multiplicity of transverse webs and longitudinal webs which bound a multiplicity of through openings. For reasons of clarity, only a first transverse strut 24, a second transverse strut 26, a first longitudinal web 28 and a second longitudinal web 30 are assigned a reference. Together with the longitudinal webs 28, 30, the transverse webs 24, 26 define a first through opening 32.

The fluid cleaned by the filter medium 20 flows from the outside through the through openings, for example the first through opening 32, into the support tube 22, from where the fluid flows axially out of the support tube 22 in the direction of a second arrow 34 and further in the direction of a third arrow 36 out of the housing 12.

A fluid sensor 38 in the form of a fluid mass sensor, here an air mass sensor, is arranged between the support tube 22 and the fluid outlet 16. The fluid sensor 38 measures part of the fluid flow. From this, the total quantity of fluid per unit time leaving the filter system 1 or the filter element 6 can be determined. However, the measurement of the fluid sensor 38 is only sufficiently precise when there is no or only a small amount of turbulence in the fluid flow. Such turbulence or other irregularities in the fluid flow occur particularly when the filter element 6 is arranged in a differently rotationally oriented position in the housing 12.

The inventors have now discovered that the extent of turbulence or the homogeneity of the fluid flow depends significantly on the shape of the longitudinal webs, for examples of the longitudinal webs 28, 30.

FIG. 2 shows a sectional plan view on a filter system 1a according to the prior art which is constructed substantially as the filter system 1 according to FIG. 1 but has a disadvantageous support tube 22a. The support tube 22a has a plurality of longitudinal webs, of which only a first longitudinal web 28a and a second longitudinal web 30a are assigned a reference for reasons of clarity. The longitudinal webs 28a and 30a have a different cross section. In particular, the longitudinal webs 28a, 30a differ with regard to their shape and therefore their flow resistance. This can result in an incoming radial flow of fluid (not shown) of different strength in the center of the support tube 22a.

In contrast, FIG. 3 shows a sectional plan view on the filter system 1 according to FIG. 1. From FIG. 3, it can be seen that all longitudinal webs, for example the longitudinal webs 28, 30, have the same quadrangular cross section. Furthermore, all longitudinal webs are aligned towards the center 40 of the support tube 22. At the same time, the longitudinal webs are arranged rotationally symmetrically with respect to the center 40.

The central longitudinal axis of the support tube 22 runs through the center 40. All longitudinal webs, for example the longitudinal webs 28, 30, are formed symmetrically with respect to the central plane thereof which runs in the longitudinal direction of the support tube 22 and intersects the central longitudinal axis of the support tube 22. In FIG. 3, only a first central plane 42 of the first longitudinal web 28 and a second central plane 44 of the second longitudinal web 30 are assigned a reference for reasons of clarity. The arrangement according to the invention of the longitudinal webs produces an equally high resistance when the fluid (not shown) flows radially into the support tube 22.

FIG. 4 shows a sectional view of a device 46a according to the prior art for producing the support tube 22a from FIG. 2 by injection molding.

The device 46a comprises a one-piece mandrel 48a with a circular cross section, against the radial outer side of which a first outer element 50a and a second outer element 52a are pressed. The outer elements 50a, 52a have recesses, of which only a first recess 58a and a second recess 60a are assigned a reference for reasons of clarity. As a result, empty spaces, of which a first empty space 62a and a second empty space 64a are assigned a reference, are formed between the mandrel 48a and the outer elements 50a, 52a. Plastic (not shown) is injected into and sets in the empty spaces, for example the empty spaces 62a, 64a. The first outer element 50a is then separated from the mandrel 48a in the direction of a fourth arrow 66a, and the second outer element 52a in the direction of a fifth arrow 68a. At the same time, the empty spaces, for example the empty spaces 62a, 64a, are designed so that the recesses, for example the recesses 58a, 60a, have no undercut, thus enabling the outer elements 50a, 52a to be moved away from the mandrel 48a in the direction of the arrow 66a, 68a without damaging the newly produced support tube 22a (see FIG. 2).

In contrast, FIG. 5 shows a device 46 according to the invention for the production of the support tube 22 according to the invention according to FIG. 3. The device 46 has a one-piece, cylindrical, that is to say circular in cross section, mandrel 48, against the radial outer side of which a first outer element 50, a second outer element 52, a third outer element 54 and a fourth outer element 56 are pressed. The outer elements 50, 52, 54, 56 have recesses, of which only a first recess 58 and a second recess 60 are assigned a reference for reasons of clarity. As a result of the recesses, for example the recesses 58, 60, empty spaces, of which a first empty space 62 and a second empty space 64 are assigned a reference, are formed between the mandrel 48 and the outer elements 50, 52, 54, 56. Plastic (not shown) is injected into and sets in the empty spaces, for example the empty spaces 62, 64, in order to produce the support tube 22 (see FIG. 3) with its longitudinal webs, for example the longitudinal webs 28, 30 (see FIG. 3). As an alternative or in addition to their formation on the outer elements 50, 52, 54, 56, the recesses, for example the recesses 58, 60, can be formed on the mandrel 48.

After the plastic has set, the first outer element 50 is moved radially away from the center 74 of the mandrel 48 in the direction of a sixth arrow 66, the second outer element 52 in the direction of a seventh arrow 68, the third outer element 54 in the direction of an eighth arrow 70 and the fourth outer element 56 in the direction of a ninth arrow 72. The empty spaces, for example the empty spaces 62, 64, are formed symmetrically with respect to the central plane thereof which runs in the longitudinal direction of the mandrel 48 and intersects the central longitudinal axis of the mandrel 48. By way of example, a first central plane 76 of the first empty space 62 and a second central plane 78 of the second empty space 64 are shown in FIG. 5.

The empty spaces, for example the empty spaces 62, 64, are arranged rotationally symmetrically with respect to the center 74 of the mandrel 48 and all have the same quadrangular cross section.

An empty space is in each case provided in all regions between two outer elements 50, 52, 54, 56 and the mandrel 48. For example, the second empty space 64 is provided in the region between the first outer element 50 and the third outer element 54. This enables the device 46 to be formed with a minimum number of outer elements without damaging the support tube 22 (see FIG. 3) when removing from the mold.

In summary, the invention therefore relates to a device for producing a support tube made of plastic for a filter element of a filter system. The longitudinal webs of the support tube are formed symmetrically with respect to the center of the support tube and preferably have the same, in particular quadrangular, cross section. At the same time, the support tube is preferably substantially cylindrical in shape overall. The support tube can be produced by injection molding by carrying out a method according to the invention in a device according to the invention, which has a mandrel, which, in particular, is cylindrical in shape, against which outer elements with recesses can be pressed. Empty spaces for the longitudinal webs are provided between the mandrel and the outer elements. The empty spaces are aligned symmetrically with respect to the center of the mandrel. In doing so, the outer elements are arranged around the mandrel so that they can be removed from the mandrel without forming undercuts in the empty spaces, so that the support tube produced with the device is not damaged when removing from the mold. By means of the invention, a support tube, into which a fluid can be sucked or pressed, can be created in a structurally simple and cost-effective manner. This is an advantage for a measurement, which is necessary in many applications, of the fluid flow fed out of the filter system or the filter element.

What is claimed is:

1. A device for producing by injection molding a one-piece support tube made of plastic, wherein
the one-piece support tube is an elongated tubular member having a central longitudinal axis extending through a hollow interior of the one-piece support tube, the one-piece support tube elongated in a longitudinal direction defined by the central axis, the one-piece support tube having a plurality of through openings extending through a circumferential wall of the one-piece support tube;

wherein the one-piece support tube is formed in one piece and a unitary component;

wherein the plurality of through openings are bounded by at least five longitudinal webs which are polygonal in cross section in at least some sections in the longitudinal direction of the one-piece support tube;

wherein the at least five longitudinal webs are in each case formed symmetrically with respect to a central plane thereof, the central plane running in the longitudinal direction of the one-piece support tube and intersecting the central longitudinal axis of the one-piece support tube;

wherein the device has a mandrel which is substantially cylindrical in shape and the outside of which bounds the inside of the support tube during the production thereof;

wherein the device has at least three outer elements which can be arranged around the mandrel;

wherein plastic is introduced between the mandrel and the outer elements into empty spaces of the device which are provided to form the longitudinal webs of the one-piece support tube;

wherein the empty spaces are formed symmetrically with respect to the central plane thereof which runs in a longitudinal direction of the mandrel and intersects the central longitudinal axis of the mandrel.

2. The device according to claim 1, wherein
empty space for a longitudinal web is provided in at least one region between two outer elements and the mandrel.

3. The device according to claim 2, wherein
the empty spaces is at least five empty spaces;
wherein for s longitudinal webs, a=s/2 outer elements are provided on the device and a is a rounded-up whole number.

4. The device according to claim 1, wherein
the one-piece support tube is formed radially symmetrically with respect to its central longitudinal axis.

5. The device according to claim 1, wherein
the longitudinal webs are formed rotationally symmetrically with respect to the central longitudinal axis of the support tube.

6. The device according to claim 1, wherein
all longitudinal webs have a same quadrangular cross section.

7. A method for producing by injection molding a one-piece support tube, wherein
the one-piece support tube is an elongated tubular member having a central longitudinal axis extending through a hollow interior of the one-piece support tube, the one-piece support tube elongated in a longitudinal direction defined by the central axis, the one-piece support tube having a plurality of through openings extending through a circumferential wall of the one-piece support tube;

wherein the one-piece support tube is formed in one piece and a unitary component;

wherein the plurality of through openings are bounded by at least five longitudinal webs which are polygonal in cross section in at least some sections in the longitudinal direction of the one-piece support tube;

wherein the at least five longitudinal webs are in each case formed symmetrically with respect to a central plane thereof, the central plane running in the longitudinal direction of the one-piece support tube and intersecting the central longitudinal axis of the one-piece support tube;

wherein the method for producing by injection molding the one-piece support tube comprises the following steps:

providing a mandrel;

pressing of at least three outer elements against an outside of the mandrel;

wherein empty spaces running at least in sections in a longitudinal direction of the mandrel are produced between the outer elements and the mandrel which in each case are formed symmetrically with respect to the central plane thereof which runs in the longitudinal direction of the mandrel and intersects a central longitudinal axis of the mandrel;

introducing plastic material into the empty spaces;

allowing the plastic to cool and set; and spacing of the outer elements from the mandrel along the central planes of the empty spaces which intersect the central longitudinal axis of the mandrel.

8. The method for producing by injection molding a one-piece support tube according to claim 7, wherein
the one-piece support tube is formed radially symmetrically with respect to its central longitudinal axis.

9. The method for producing by injection molding a one-piece support tube according to claim 7, wherein
the longitudinal webs are formed rotationally symmetrically with respect to the central longitudinal axis of the support tube.

10. The method for producing by injection molding a one-piece support tube according to claim 7, wherein
all longitudinal webs have a same quadrangular cross section.

11. The method for producing by injection molding a one-piece support tube according to claim 7, wherein, after the spacing step, the method further comprises
arranging a ring-shaped filter medium onto a radially outer side of the one-piece support tube, so as to rest directly against the longitudinal webs on the radially outer side of the one-piece support tube.

* * * * *